United States Patent
Ma et al.

(10) Patent No.: US 12,211,316 B2
(45) Date of Patent: Jan. 28, 2025

(54) FIELD SEQUENCE COLOR DISPLAY DRIVING METHOD AND DISPLAY DEVICE

(71) Applicant: WUHAN CHINA STAR OPTOELECTRONICS TECHNOLOGY CO., LTD., Hubei (CN)

(72) Inventors: Changwen Ma, Hubei (CN); Guowei Zha, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 18/458,155

(22) Filed: Aug. 30, 2023

(65) Prior Publication Data

US 2024/0257558 A1   Aug. 1, 2024

(30) Foreign Application Priority Data

Jan. 31, 2023 (CN) .......................... 202310099729.8

(51) Int. Cl.
G06V 40/19 (2022.01)
G06V 40/18 (2022.01)

(52) U.S. Cl.
CPC ............ *G06V 40/19* (2022.01); *G06V 40/193* (2022.01); *G06V 40/197* (2022.01)

(58) Field of Classification Search
CPC .... G06V 40/19; G06V 40/193; G06V 40/197; G06F 3/013; G06F 3/0304; G06F 3/04817; G06F 3/0482; G06F 21/316; G06F 21/32; G02B 27/0093

See application file for complete search history.

(56) References Cited

U.S. PATENT DOCUMENTS

| | | | | |
|---|---|---|---|---|
| 2016/0085302 A1* | 3/2016 | Publicover | ........... | G02B 27/017 345/633 |
| 2021/0373657 A1* | 12/2021 | Connor | ..................... | G06T 5/90 |
| 2022/0334636 A1* | 10/2022 | Miettinen | ............... | G06F 3/013 |

* cited by examiner

*Primary Examiner* — Abhishek Sarma
(74) *Attorney, Agent, or Firm* — PV IP PC; Wei Te Chung (57) ABSTRACT

A field sequence color (FSC) display driving method includes matching an eye movement amplitude with a preset amplitude, obtaining an eye state data according to the matching result of the eye movement amplitude and the preset amplitude, and obtaining a target pixel coordinate of the target corresponding to a pixel data to be displayed based on the eyeball state data. The pixel data is displayed according to the target pixel coordinate.

16 Claims, 6 Drawing Sheets

FIELD SEQUENCE COLOR DISPLAY DRIVING METHOD AND DISPLAY DEVICE

CROSS REFERENCE TO RELATED APPLICATION

This application claims priority to Chinese Application No. 202310099729.8, filed on Jan. 31, 2023. The entire disclosure of the above application is incorporated herein by reference.

FIELD OF THE DISCLOSURE

The present disclosure relates to a display technology, and more particularly, to a field sequence color display driving method and a display device.

BACKGROUND

Figure 1:
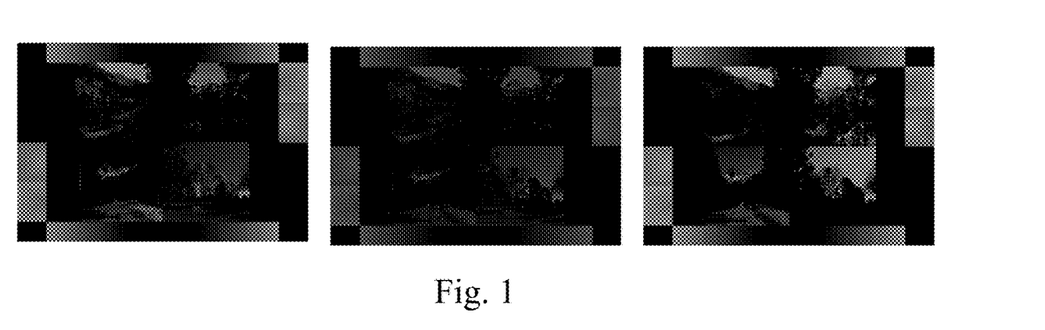
FIG. 1 is a diagram of a conventional field sequence color display.

Different from the conventional Liquid Crystal Display (LCD) technology that uses red, green and blue (RGB) three-color sub-pixel space superposition to achieve color display, the field sequence color (FSC) display technology mainly uses time frequency color switching and superposition to achieve color display. For example, when any pixel on the screen switches between the R field sequence, the G field sequence, and the B field sequence at a frequency of 240 Hz (as shown in three images of left, center, right and three images in FIG. 1), the overall display effect can be considered equivalent to a 60 Hz full-color display.

The advantage of this technology is that RGB color is no longer provided by color filters (CF) on the LCD. Instead, it can be directly provided by the color backlight, which will eliminate the loss of light efficiency caused by CFs, improve energy utilization, help improve brightness and reduce power consumption. At the same time, since RGB three sub-pixels are no longer required compared with traditional LCD display technology, the display resolution (PPI) is increased by 3 times under the same sub-pixel conditions.

Figure 2:
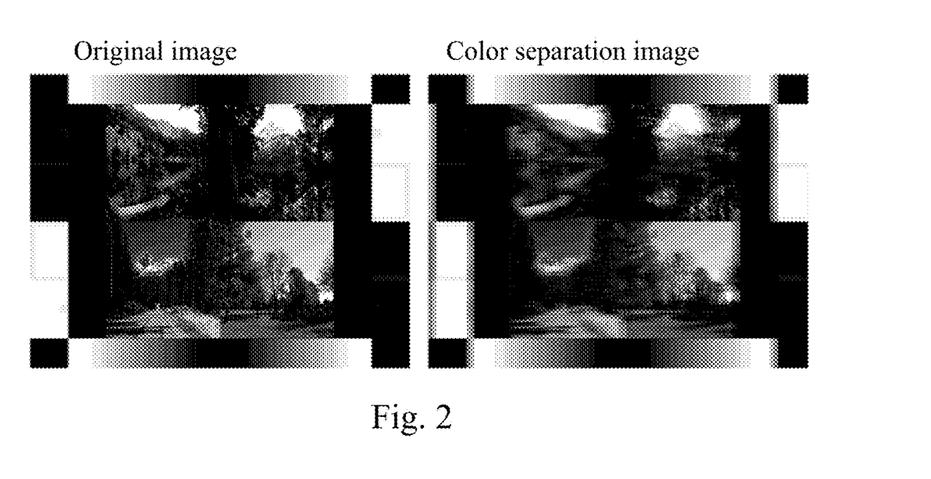
FIG. 2 shows a comparison before and after color separation in the conventional field sequence color display.

However, this technology also has its own unique issue, such as the visual perception of color separation problems shown in FIG. 2. That is, when the human eye moves relative to the screen when the screen is displaying an image (that is, when the eye rotates horizontally), the edges of the white target will appear red and yellow separated colors.

Figure 3:
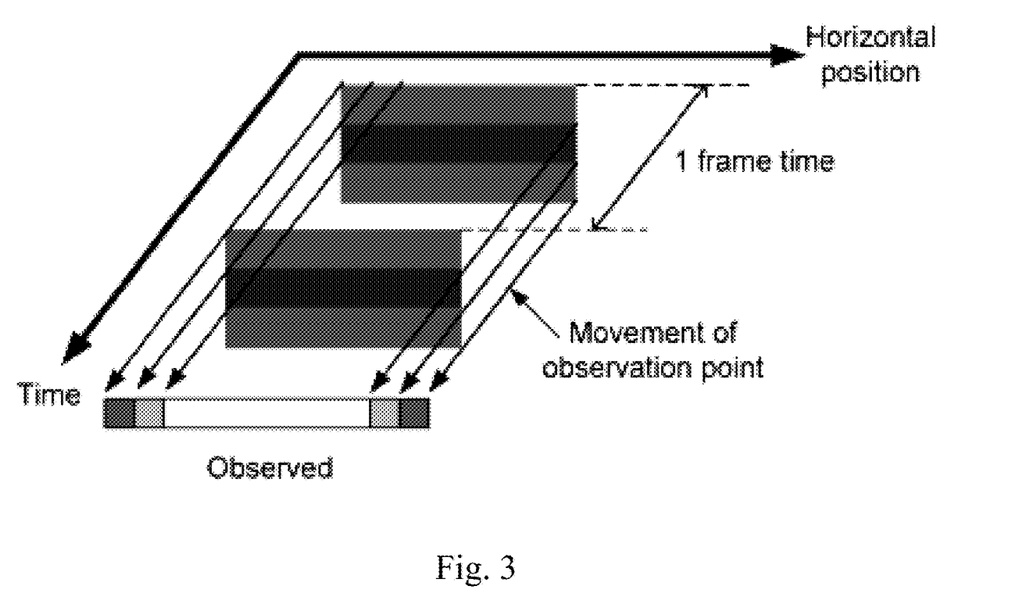
FIG. 3 shows the principle of color separation in the field color sequence display.

The principle of color separation is shown in FIG. 3. The X axis represents the horizontal position, and the Y axis represents the time. If the human eye rotates under certain circumstances (it means that there is a movement of observation point), within one frame (1 frame time), the RGB component of the same point in an image scanned in a certain time order will fall in different positions on the retina, so the human eye will observe the color separation of the image, which is called the color separation phenomenon.

SUMMARY

One objective of an embodiment of the present disclosure is to provide a field sequence color display driving method and a display device, to alleviate the color separation phenomenon.

According to an embodiment of the present disclosure, a field sequence color (FSC) display driving method is disclosed. The FSC display driving method includes: matching an eye movement amplitude with a preset amplitude; obtaining an eye state data according to the matching result of the eye movement amplitude and the preset amplitude; obtaining a target pixel coordinate of the target corresponding to a pixel data to be displayed based on the eyeball state data; and displaying the pixel data to be displayed according to the target pixel coordinate.

In some embodiments of the present disclosure, the step of obtaining the target pixel coordinate of the target corresponding to the pixel data to be displayed based on the eyeball state data comprises: constructing the eye state data to include an estimated eye movement distance, an eye angle and an eye rotation radius; wherein the eye rotation radius is an approximate distance between a pupil and the center of eye rotation; and the eye angle is an angle between a line of sight emitted by an eye and a horizontal direction; and determining an eye rotation angle according to the estimated eye movement distance, the eye angle and the eye rotation radius.

In some embodiments of the present disclosure, the estimated eye movement distance is S', the eye angle is d, a horizontal component of the estimated eye movement distance is S'x, and a vertical component of the estimated eye movement distance is S'y; and the step of determining the eye rotation angle according to the estimated eye movement distance, the eye angle and the eye rotation radius comprises: determining the horizontal component of the estimated eye movement distance S'x=S'*cos d; and determining the vertical component of the estimated eye movement distance S'y=S'*sin d.

In some embodiments of the present disclosure, the step of determining the eye rotation angle based on the estimated eye movement distance, the eye angle and the eye rotation radius further comprises: configuring the eye rotation angle to include a lateral eye rotation angle and a vertical eye rotation angle; determining the lateral eye rotation angle according to the eye rotation radius and the horizontal component of the estimated eye movement distance; and determining the vertical eye rotation angle according to the eye rotation radius and the vertical component of the estimated eye movement distance.

In some embodiments of the present disclosure, the step of determining the lateral eye rotation angle according to the eye rotation radius and the horizontal component of the estimated eye movement distance comprises: configuring the eye rotation radius as r, the eye rotation angle as θ, and lateral eye rotation angle $\theta_x$; and determining the lateral eye rotation angle according to S'*cos d=2r*sin $\theta_x$.

In some embodiments of the present disclosure, the step of determining the vertical eye rotation angle according to the eye rotation radius and the vertical component of the estimated eye movement distance comprises: configuring the vertical eye rotation angle as θy; and determining the vertical eye rotation angle according to S'*sin d=2r*sin $\theta_y$.

In some embodiments of the present disclosure, the step of obtaining the target pixel coordinate of the target corresponding to the pixel data to be displayed based on the eye state data comprises: configuring the eye state data to include an eye initial angle, wherein the eye initial angle is an angle between the line of sight of the pupil and a direct line of sight of the eye facing the display panel. The eye initial angle comprises a lateral eye initial angle and a vertical eye initial angle.

In some embodiments of the present disclosure, the step of obtaining the target pixel coordinate of the target corresponding to the pixel data to be displayed based on the eyeball state data comprises: setting the lateral eye initial angle as ax, the vertical eye initial angle as $\alpha_y$, a viewing distance as L, an abscissa of the target pixel coordinate as X, and an ordinate of the target pixel coordinate as Y; where $$X = L * [\tan(\alpha_x + \theta_x) - \tan(\alpha_x)],$$

$$\text{and } Y = L * [\tan(\alpha_y + \theta_y) - \tan(\alpha_y)].$$

In some embodiments of the present disclosure, the step of obtaining the eye state data according to the matching result of the eye movement amplitude and the preset amplitude comprises: comparing the eye movement amplitude with the preset amplitude; and when the eye movement amplitude is greater than or equal to the preset amplitude, obtaining the eye state data.

According to another embodiment of the present disclosure, a display device is disclosed. The display device includes a processor and a memory storing program instructions executable by the processor to execute operations. The operations includes: matching an eye movement amplitude with a preset amplitude; obtaining an eye state data according to the matching result of the eye movement amplitude and the preset amplitude; obtaining a target pixel coordinate of the target corresponding to a pixel data to be displayed based on the eyeball state data; and displaying the pixel data to be displayed according to the target pixel coordinate.

In some embodiments of the present disclosure, the step of obtaining the target pixel coordinate of the target corresponding to the pixel data to be displayed based on the eyeball state data comprises: constructing the eye state data to include an estimated eye movement distance, an eye angle and an eye rotation radius; wherein the eye rotation radius is an approximate distance between a pupil and the center of eye rotation; and the eye angle is an angle between a line of sight emitted by an eye and a horizontal direction; and determining an eye rotation angle according to the estimated eye movement distance, the eye angle and the eye rotation radius.

In some embodiments of the present disclosure, the estimated eye movement distance is S', the eye angle is d, a horizontal component of the estimated eye movement distance is S'x, and a vertical component of the estimated eye movement distance is S'y; and the operation of determining the eye rotation angle according to the estimated eye movement distance, the eye angle and the eye rotation radius comprises: determining the horizontal component of the estimated eye movement distance S'x=S'*cos d; and determining the vertical component of the estimated eye movement distance S'y=S'*sin d.

In some embodiments of the present disclosure, the operation of determining the eye rotation angle based on the estimated eye movement distance, the eye angle and the eye rotation radius further comprises: configuring the eye rotation angle to include a lateral eye rotation angle and a vertical eye rotation angle; determining the lateral eye rotation angle according to the eye rotation radius and the horizontal component of the estimated eye movement distance; and determining the vertical eye rotation angle according to the eye rotation radius and the vertical component of the estimated eye movement distance.

In some embodiments of the present disclosure, the operation of determining the lateral eye rotation angle according to the eye rotation radius and the horizontal component of the estimated eye movement distance comprises: configuring the eye rotation radius as r, the eye rotation angle as θ, and lateral eye rotation angle $\theta_x$; and determining the lateral eye rotation angle according to S'*cos d=2r*sin $\theta_x$.

In some embodiments of the present disclosure, the operation of determining the vertical eye rotation angle according to the eye rotation radius and the vertical component of the estimated eye movement distance comprises: configuring the vertical eye rotation angle as θy; and determining the vertical eye rotation angle according to $$S' * \sin d = 2r * \sin\theta_y.$$

In some embodiments of the present disclosure, the operation of obtaining the target pixel coordinate of the target corresponding to the pixel data to be displayed based on the eye state data comprises: configuring the eye state data to include an eye initial angle, wherein the eye initial angle is an angle between the line of sight of the pupil and a direct line of sight of the eye facing the display panel. The eye initial angle comprises a lateral eye initial angle and a vertical eye initial angle.

In some embodiments of the present disclosure, the operation of obtaining the target pixel coordinate of the target corresponding to the pixel data to be displayed based on the eyeball state data comprises: setting the lateral eye initial angle as $\alpha_x$, the vertical eye initial angle as $\alpha_y$, a viewing distance as L, an abscissa of the target pixel coordinate as X, and an as ordinate of the target pixel coordinate Y; where $$X = L * [\tan(\alpha_x + \theta_x) - \tan(\alpha_x)],$$

$$\text{and } Y = L * [\tan(\alpha_y + \theta_y) - \tan(\alpha_y)].$$

In some embodiments of the present disclosure, the step of obtaining the eye state data according to the matching result of the eye movement amplitude and the preset amplitude comprises: comparing the eye movement amplitude with the preset amplitude; and when the eye movement amplitude is greater than or equal to the preset amplitude, obtaining the eye state data.

The field sequence color display driving method and the display device in the present disclosure obtain the eye state data according to the matching results of the eye movement amplitude and the preset amplitude, obtain the target pixel coordinate corresponding to the pixel data to be displayed based on the eye state data, and then displays the pixel data to be displayed according to the target pixel coordinate. This could display the pixel data to be displayed in accordance with the target pixel coordinate related to the eye state data. Thus, this can improve the matching degree between the display content and the eye movement, thereby improving the color separation phenomenon.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The term "first", "second" are for illustrative purposes only and are not to be construed as indicating or imposing a relative importance or implicitly indicating the number of technical features indicated. Thus, a feature that limited by "first", "second" may expressly or implicitly include at least one of the features.

In the description of the present disclosure, the meaning of "plural" is two or more, unless otherwise specifically defined.

Throughout the specification and claims, when it is described that an element is "connected" to another element, the element may be "directly connected" to the other element, or "electrically connected" to the other element through a third element.

Furthermore, the term "comprising" will be understood as meaning the inclusion of elements but not the exclusion of any other elements, unless explicitly described to the contrary.

The following disclosure provides many different embodiments or examples to implement different structures of the present disclosure. In order to simplify the disclosure of the present disclosure, the components and settings of specific examples are described below. They are for example purposes only and are not intended to limit this application. Further, the present disclosure may repeat reference numbers and/or reference letters in different examples, such duplication is for the purpose of simplification and clarity, and does not by itself indicate the relationship between the various embodiments and/or settings discussed. Further, the present disclosure provides various examples of specific processes and materials, but those of ordinary skill in the art may be aware of the application of other processes and/or the use of other materials. The following are described in detail, it should be noted that the order of description of the following embodiments is not used as a qualification for the preferred order of embodiments.

Figure 4:
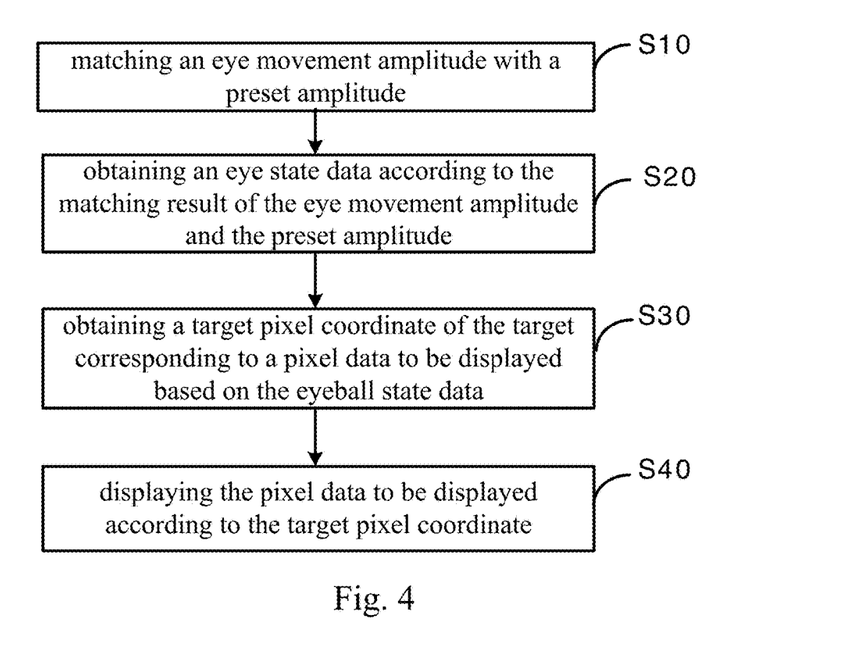
FIG. 4 is a flow chart of a field sequence color display driving method according to an embodiment of the present disclosure.

In view of the aforementioned color separation issue, a field sequence color (FSC) display driving method is disclosed according to an embodiment of the present disclosure. Please refer to FIGS. 4 to 9. As shown in FIG. 4, the FSC display driving method comprises the following steps:

Step S10: matching an eye movement amplitude with a preset amplitude.

Step S20: obtaining an eye state data according to the matching result of the eye movement amplitude and the preset amplitude.

Step S30: obtaining a target pixel coordinate of the target corresponding to a pixel data to be displayed based on the eyeball state data.

Step S40: displaying the pixel data to be displayed according to the target pixel coordinate.

The field sequence color display driving method in the present disclosure obtain the eye state data according to the matching results of the eye movement amplitude and the preset amplitude, obtain the target pixel coordinate corresponding to the pixel data to be displayed based on the eye state data, and then displays the pixel data to be displayed according to the target pixel coordinate. This could display the pixel data to be displayed in accordance with the target pixel coordinate related to the eye state data. Thus, this can improve the matching degree between the display content and the eye movement, thereby improving the color separation phenomenon.

Figure 5:
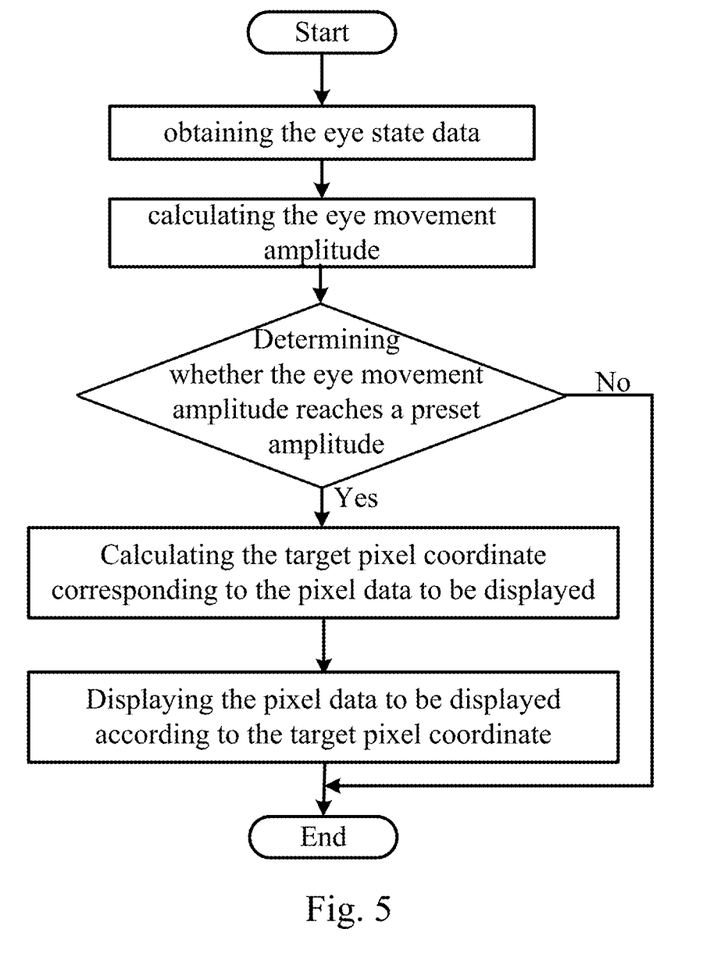
FIG. 5 is a flow chart of a field sequence color display driving method according to another embodiment of the present disclosure.

Before matching the eye movement amplitude with the preset amplitude, it may include another step of obtaining the eye state data shown in FIG. 5 and then calculating the eye movement amplitude.

Figure 7:
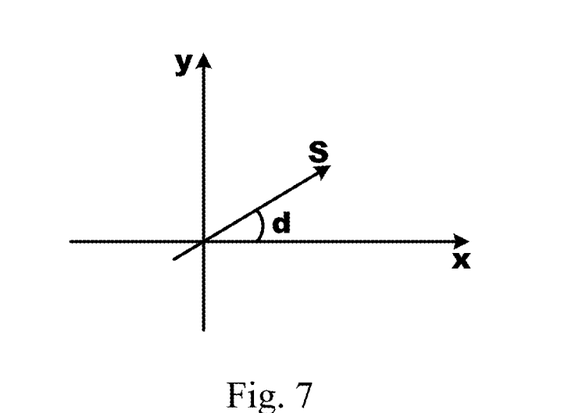
FIG. 7 is a diagram of the eye state data shown in FIG. 5.

The eye state data include the eye movement distance S, the movement time t, and the eye angle d. The eye movement distance S and the eye angle d are shown in FIG. 7. The eye angle d is an angle between the line of sight emitted by the eye and the horizontal direction (x-axis).

The FSC display driving method can obtain the eye state data by reading the corresponding device/module parameters in the system. Alternatively, the eye state data can be provided by an external system or can be calculated by a software after an internal system reads data from a corresponding sensor.

Figure 6:
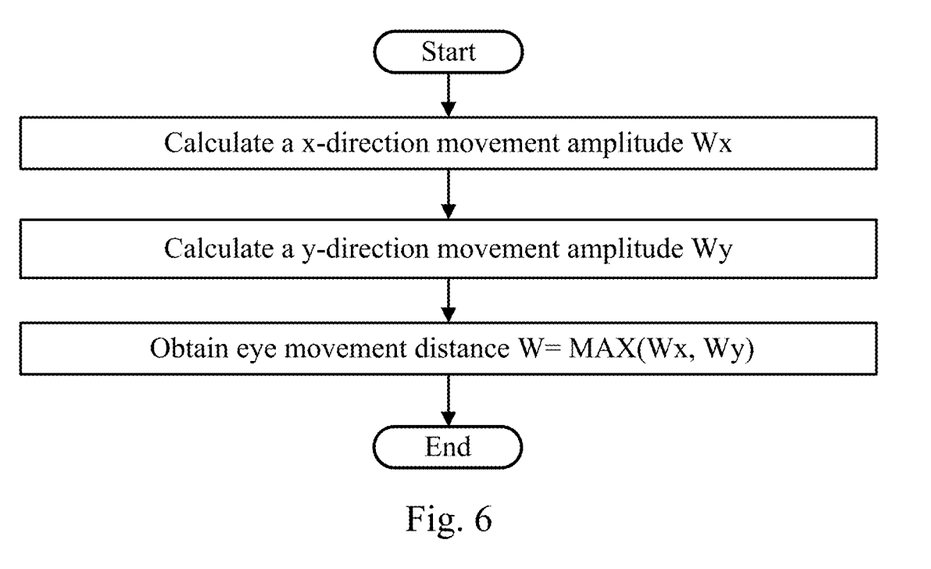
FIG. 6 is a flow chart of calculating the eye movement amplitude in FIG. 5.

As shown in FIG. 6 and FIG. 7, the eye movement distance S corresponds to the x-direction movement amplitude Wx and y-direction movement amplitude Wy in the X-axis and Y-axis of the screen coordinates. Here, the x-direction movement amplitude Wx=S*cos d. The y-direction movement amplitude Wy=S*sin d. The eye movement distance W=MAX(Wx, Wy). That is, the greater of the values Wx and Wy is taken as the eye movement distance.

Then, whether the eye movement amplitude W reaches the preset amplitude is determined according to the step shown in FIG. 5 (that is, to match the eye movement amplitude with the preset amplitude). When the eye movement amplitude W is less than the preset amplitude, this indicates that the eye movement amplitude W is small and the observed color separation phenomenon is not obvious. At this time, the pixel data to be displayed in this frame can be directly displayed, and there is no need to calculate the target pixel coordinate corresponding to the pixel data to be displayed and displaying the pixel data to be displayed according to the target pixel coordinate. When the eye movement amplitude W is greater than or equal to the preset amplitude, this indicates that the eye movement amplitude W is large and the observed color separation phenomenon is more obvious. In this case, the target pixel coordinate corresponding to the pixel data to be displayed is calculated, and the pixel data to be displayed is displayed according to the target pixel coordinate. This can effectively improve this color separation issue.

The step of obtaining the target pixel coordinate of the target corresponding to the pixel data to be displayed based on the eyeball state data comprises: constructing the eye state data to include an estimated eye movement distance, an eye angle and an eye rotation radius; and determining an eye rotation angle according to the estimated eye movement distance, the eye angle and the eye rotation radius. Here the eye rotation radius is an approximate distance between a pupil and the center of eye rotation.

The above approximate distance is not the true radius of the eye because the eye does not rotate with its exact center as the rotation point. So the eye rotation radius is the approximate distance between the pupil and the true center of rotation of the eye.

Figure 8:
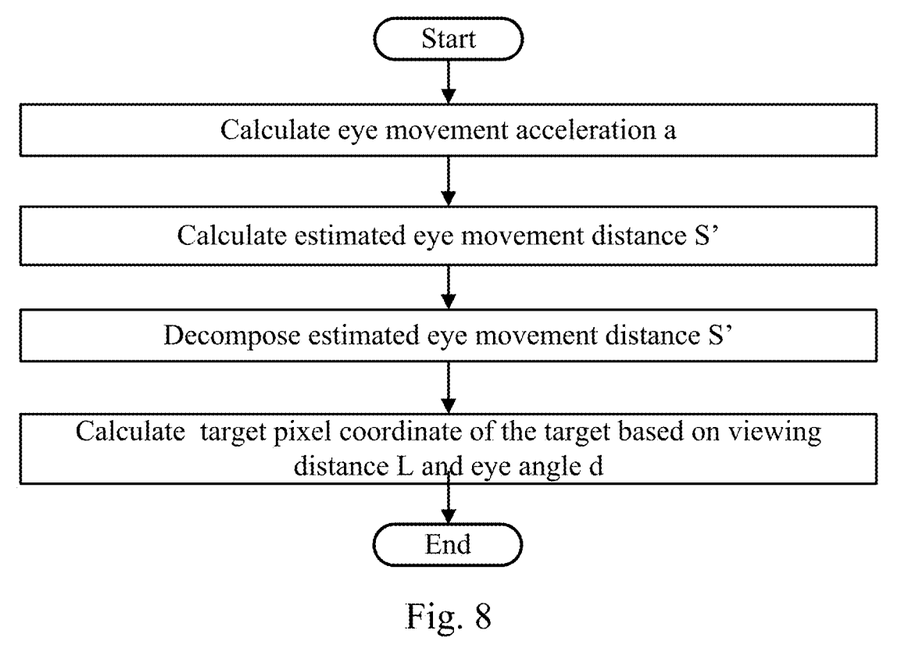
FIG. 8 is a flow chart of calculating the target pixel coordinate according to an embodiment of the present disclosure.
Figure 9:
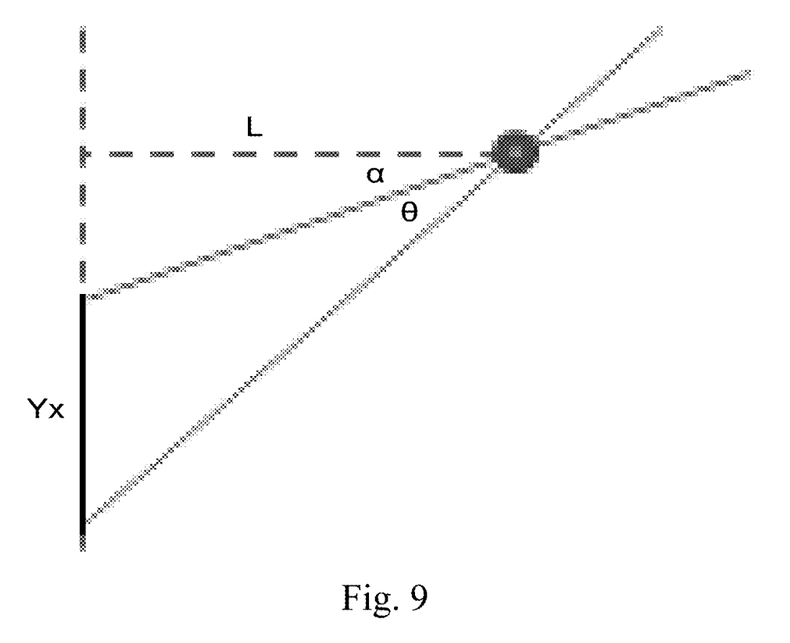
FIG. 9 is a diagram of the eye initial angle and the eye rotation angle according to an embodiment of the present disclosure.

The estimated eye movement distance can be calculated by simulating the eye movement speed based on the estimated acceleration model:

As shown in FIG. 8, first, the eye movement acceleration a=dv/dt is calculated. Then, based on the eye movement acceleration a, the estimated eye movement distance S'=∫dvdt is calculated.

The eye rotation radius can be preset data or predictive data, or it can be obtained by an external device. Compared with directly obtaining the eye movement angle through the external device, the algorithm of this embodiment can improve the accuracy of the eye movement angle and reduce the required sensors.

Here, the estimated eye movement distance is S', the eye angle is d, a horizontal component of the estimated eye movement distance is S'x, and a vertical component of the estimated eye movement distance is S'y. The step of determining the eye rotation angle according to the estimated eye movement distance, the eye angle and the eye rotation radius comprises: determining the horizontal component of the estimated eye movement distance S'x=S'*cos d; and determining the vertical component of the estimated eye movement distance S'y=S'*sin d.

As shown in FIG. 8, the estimated eye movement distance S' could be decomposed into the horizontal component S'x of the estimated eye movement in the X-axis and the vertical component S'y of the estimated eye movement distance in the Y-axis.

The step of determining the eye rotation angle based on the estimated eye movement distance, the eye angle and the eye rotation radius further comprises: configuring the eye rotation angle to include a lateral eye rotation angle and a vertical eye rotation angle; determining the lateral eye rotation angle according to the eye rotation radius and the horizontal component of the estimated eye movement distance; and determining the vertical eye rotation angle according to the eye rotation radius and the vertical component of the estimated eye movement distance.

In this embodiment, the eye rotation angle is decomposed in order to finally obtain the eye movement distance in the X-axis and Y-axis and uses the movement distance as the target pixel coordinate.

The step of determining the lateral eye rotation angle according to the eye rotation radius and the horizontal component of the estimated eye movement distance comprises: configuring the eye rotation radius as r, the eye rotation angle as θ, and lateral eye rotation angle $\theta_x$; and determining the lateral eye rotation angle according to S'*cos d=2r*sin $\theta_x$.

In this embodiment, the eye is treated as a sphere, and the lateral eye rotation angle is obtained by the chord length formula. Here, r is the radius of the sphere, S'*cos d is the vector distance and also regarded as a chord length, which includes the movement direction and the movement distance of the eye.

Furthermore, compared with utilizing an external device or sensor to directly obtain the lateral eye movement angle, the algorithm of this embodiment can more accurately estimate the lateral eye movement angle.

The step of determining the vertical eye rotation angle according to the eye rotation radius and the vertical component of the estimated eye movement distance comprises: configuring the vertical eye rotation angle as θy; and determining the vertical eye rotation angle according to S'*sin d=2r*sin θy.

In this embodiment, the eye is treated as a sphere, and the vertical eye rotation angle is obtained by the chord length formula. Here, r is the radius of the sphere, S'*sin d is another vector distance and also regarded as another chord length, which also includes the movement direction and the movement distance of the eye.

Furthermore, compared with utilizing an external device or sensor to directly obtain the vertical eye movement angle, the algorithm of this embodiment can more accurately estimate the vertical eye movement angle.

The step of obtaining the target pixel coordinate of the target corresponding to the pixel data to be displayed based on the eye state data comprises: configuring the eye state data to include an eye initial angle. Here, the eye initial angle is an angle between the line of sight of the pupil and a direct line of sight of the eye facing the display panel. The eye initial angle comprises a lateral eye initial angle and a vertical eye initial angle.

In this embodiment, the eye initial angle, the lateral eye initial angle and the vertical eye initial angle may be directly obtained by an external device or a sensing system, or may be obtained by a similar calculation method of the eye rotation angle, the lateral eye rotation angle and the vertical eye rotation angle. Further details are omitted for simplicity.

The step of obtaining the target pixel coordinate of the target corresponding to the pixel data to be displayed based on the eyeball state data comprises: setting the lateral eye initial angle as $\alpha_x$, the vertical eye initial angle as $\alpha_y$, a viewing distance as L, an abscissa of the target pixel coordinate as X, and an ordinate of the target pixel coordinate as Y. Then, $$X = L * [\tan(\alpha_x + \theta_x) - \tan(\alpha_x)],$$

$$\text{and } Y = L * \lfloor \tan(\alpha_y + \theta_y) - \tan(\alpha_y) \rfloor.$$

In this embodiment, the eye movement distance in two different directions are taken as the abscissa and ordinate of the target pixel coordinate. This allows the eye movement speed to match with the position movement of the display screen, thereby alleviating or eliminating the color separation issue.

The step of obtaining the eye state data according to the matching result of the eye movement amplitude and the preset amplitude comprises: comparing the eye movement amplitude with the preset amplitude; and obtaining the eye state data when the eye movement amplitude is greater than or equal to the preset amplitude.

According to an embodiment, the eye state data is obtained only when the eye movement amplitude is greater than or equal to the preset amplitude. This can reduce the required operations for obtaining the eye state data, thereby reducing the working load of the sensor or the sensing system and reducing the power consumption. Alternatively, the calculation amount of the FSC display driving method can be reduced. This could improve the efficiency of the FSC display driving method.

Figure 10:
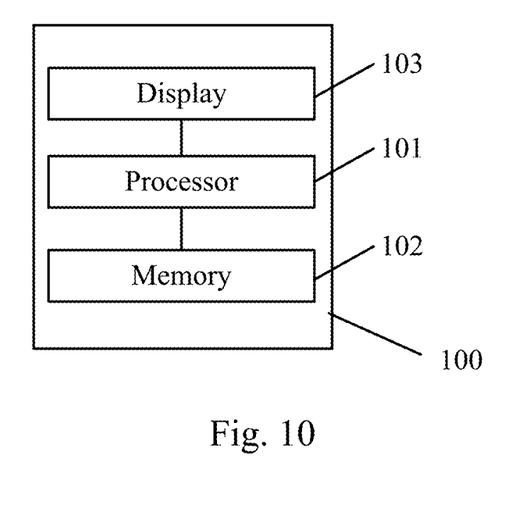
FIG. 10 illustrates a block diagram of a display device according to another embodiment of the present disclosure.

Please refer to FIG. 10 illustrating a block diagram of a display device according to another embodiment of the present disclosure. According to another embodiment of the present disclosure, a display device 100 includes a processor 101, a memory 102, a display 103. The memory 102 stores program instructions executable by the processor 101 to execute operations as provided in the FSC display driving method in the above-mentioned embodiments. The display 103 displays the pixel data to be displayed according to the target pixel coordinate.

The display device in the present disclosure field sequence color display driving method and the obtain the eye state data according to the matching results of the eye movement amplitude and the preset amplitude, obtain the target pixel coordinate corresponding to the pixel data to be displayed based on the eye state data, and then displays the pixel data to be displayed according to the target pixel coordinate. This could display the pixel data to be displayed in accordance with the target pixel coordinate related to the eye state data. Thus, this can improve the matching degree between the display content and the eye movement, thereby improving the color separation phenomenon.

It should be noted that the above display device may be an Augmented Reality (AR) device, a Virtual Reality (VR) device, or a Head-Up Display (HUD) device. The above driving method for field color sequential display can be integrated into AR equipment, VR equipment or HUD equipment.

In the foregoing embodiments, the descriptions of each embodiment have their own emphases, and for parts not described in detail in a certain embodiment, reference may be made to relevant descriptions of other embodiments.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A field sequence color (FSC) display driving method, comprising:
    matching an eye movement amplitude with a preset amplitude;
    obtaining an eye state data according to the matching result of the eye movement amplitude and the preset amplitude;
    obtaining a target pixel coordinate of the target corresponding to a pixel data to be displayed based on the eyeball state data; and
    displaying the pixel data to be displayed according to the target pixel coordinate,
    wherein the step of obtaining the target pixel coordinate of the target corresponding to the pixel data to be displayed based on the eyeball state data comprises:
    constructing the eye state data to include an estimated eye movement distance, an eye angle and an eye rotation radius; wherein the eye rotation radius is an approximate distance between a pupil and the center of eye rotation; and the eye angle is an angle between a line of sight emitted by an eye and a horizontal direction; and
    determining an eye rotation angle according to the estimated eye movement distance, the eye angle and the eye rotation radius.

2. The FSC display driving method of claim 1, wherein the estimated eye movement distance is S', the eye angle is d, a horizontal component of the estimated eye movement distance is S'x, and a vertical component of the estimated eye movement distance is S'y; and the step of determining the eye rotation angle according to the estimated eye movement distance, the eye angle and the eye rotation radius comprises:
    determining the horizontal component of the estimated eye movement distance $$S'x = S' * \cos d; \text{ and}$$

determining the vertical component of the estimated eye movement distance $$S'y = S' * \sin d.$$

3. The FSC display driving method of claim 2, wherein the step of determining the eye rotation angle based on the estimated eye movement distance, the eye angle and the eye rotation radius further comprises:
    configuring the eye rotation angle to include a lateral eye rotation angle and a vertical eye rotation angle;
    determining the lateral eye rotation angle according to the eye rotation radius and the horizontal component of the estimated eye movement distance; and
    determining the vertical eye rotation angle according to the eye rotation radius and the vertical component of the estimated eye movement distance.

4. The FSC display driving method of claim 3, wherein the step of determining the lateral eye rotation angle according to the eye rotation radius and the horizontal component of the estimated eye movement distance comprises:
    configuring the eye rotation radius as r, the eye rotation angle as θ, and lateral eye rotation angle $\theta_x$; and
    determining the lateral eye rotation angle according to S'*cosd=2r*sin$\theta_x$.

5. The FSC display driving method of claim 4, wherein the step of determining the vertical eye rotation angle according to the eye rotation radius and the vertical component of the estimated eye movement distance comprises:
    configuring the vertical eye rotation angle as $\theta_y$; and
    determining the vertical eye rotation angle according to S'*sind=2r*sin $\theta_y$.

6. The FSC display driving method of claim 5, wherein the step of obtaining the target pixel coordinate of the target corresponding to the pixel data to be displayed based on the eye state data comprises:
    configuring the eye state data to include an eye initial angle, wherein the eye initial angle is an angle between the line of sight of the pupil and a direct line of sight of the eye facing the display panel;
    wherein the eye initial angle comprises a lateral eye initial angle and a vertical eye initial angle.

7. The FSC display driving method of claim 6, wherein the step of obtaining the target pixel coordinate of the target corresponding to the pixel data to be displayed based on the eyeball state data comprises:
setting the lateral eye initial angle as ax, the vertical eye initial angle as $\alpha_y$, a viewing distance as L, an abscissa of the target pixel coordinate as X, and an ordinate of the target pixel coordinate as Y;

where $X = L * [\tan(\alpha x_x - \tan(\alpha_x())[])]$, and $Y = L * [\tan(\alpha_y + \theta_y) - \tan(\alpha_y)]$.

8. The FSC display driving method of claim 1, wherein the step of obtaining the eye state data according to the matching result of the eye movement amplitude and the preset amplitude comprises:
comparing the eye movement amplitude with the preset amplitude; and
when the eye movement amplitude is greater than or equal to the preset amplitude, obtaining the eye state data.

9. A display device, comprising:
a memory, storing program instructions;
a processor, configured to execute the program instructions to perform operations comprising:
matching an eye movement amplitude with a preset amplitude;
obtaining an eye state data according to the matching result of the eye movement amplitude and the preset amplitude; and
obtaining a target pixel coordinate of the target corresponding to a pixel data to be displayed based on the eyeball state data;
a display, for displaying the pixel data to be displayed according to the target pixel coordinate,
wherein an operation of obtaining the target pixel coordinate of the target corresponding to the pixel data to be displayed based on the eyeball state data comprises:
constructing the eye state data to include an estimated eye movement distance, an eye angle and an eye rotation radius; wherein the eye rotation radius is an approximate distance between a pupil and the center of eye rotation; and the eye angle is an angle between a line of sight emitted by an eye and a horizontal direction; and
determining an eye rotation angle according to the estimated eye movement distance, the eye angle and the eye rotation radius.

10. The display device of claim 9, wherein the estimated eye movement distance is S', the eye angle is d, a horizontal component of the estimated eye movement distance is S'x, and a vertical component of the estimated eye movement distance is S'y; and the step of determining the eye rotation angle according to the estimated eye movement distance, the eye angle and the eye rotation radius comprises:
determining the horizontal component of the estimated eye movement distance $S'x = S' * \cos d$; and determining the vertical component of the estimated eye movement distance $S'y = S' * \sin d$.

11. The display device of claim 10, wherein an operation of determining the eye rotation angle based on the estimated eye movement distance, the eye angle and the eye rotation radius further comprises:
configuring the eye rotation angle to include a lateral eye rotation angle and a vertical eye rotation angle;
determining the lateral eye rotation angle according to the eye rotation radius and the horizontal component of the estimated eye movement distance; and
determining the vertical eye rotation angle according to the eye rotation radius and the vertical component of the estimated eye movement distance.

12. The display device of claim 11, wherein an operation of determining the lateral eye rotation angle according to the eye rotation radius and the horizontal component of the estimated eye movement distance comprises:
configuring the eye rotation radius as r, the eye rotation angle as θ, and lateral eye rotation angle $\theta_x$; and
determining the lateral eye rotation angle according to $S'*\cos d = 2r*\sin\theta_x$.

13. The display device of claim 10, wherein an operation of determining the vertical eye rotation angle according to the eye rotation radius and the vertical component of the estimated eye movement distance comprises:
configuring the vertical eye rotation angle as θy; and
determining the vertical eye rotation angle according to $S'*\sin d = 2r*\sin\theta_y$.

14. The display device of claim 13, wherein an operation of obtaining the target pixel coordinate of the target corresponding to the pixel data to be displayed based on the eye state data comprises:
configuring the eye state data to include an eye initial angle, wherein the eye initial angle is an angle between the line of sight of the pupil and a direct line of sight of the eye facing the display panel;
wherein the eye initial angle comprises a lateral eye initial angle and a vertical eye initial angle.

15. The display device of claim 14, wherein an operation of obtaining the target pixel coordinate of the target corresponding to the pixel data to be displayed based on the eyeball state data comprises:
setting the lateral eye initial angle as ax, the vertical eye initial angle as $\alpha_y$, a viewing distance as L, an abscissa of the target pixel coordinate as X, and an ordinate of the target pixel coordinate as Y;

where $X = L * [\tan(\alpha x_x - \tan(\alpha_x())[])]$, and $Y = L * [\tan(\alpha_y + \theta_y) - \tan(\alpha_y)]$.

16. The display device of claim 9, wherein an operation of obtaining the eye state data according to the matching result of the eye movement amplitude and the preset amplitude comprises:
comparing the eye movement amplitude with the preset amplitude; and
when the eye movement amplitude is greater than or equal to the preset amplitude, obtaining the eye state data.

* * * * *